United States Patent [19]

Krinski et al.

[11] Patent Number: 5,766,331

[45] Date of Patent: Jun. 16, 1998

[54] PROTEIN ADHESIVE BINDER AND PROCESS FOR FORMING A PROTEIN ADHESIVE BINDER

[75] Inventors: Thomas L. Krinski, Granite City, Ill.; Lawrence M. Scacciaferro, St. Louis, Mo.

[73] Assignee: Protein Technologies International, Inc., St. Louis, Mo.

[21] Appl. No.: 739,110

[22] Filed: Oct. 25, 1996

[51] Int. Cl.⁶ .................. C09D 189/00; C09J 189/00
[52] U.S. Cl. .................. 106/157.2; 106/128.1; 106/131.1; 106/132.2; 106/134.1; 106/134.2; 106/151.1; 106/151.2; 106/155.2; 106/156.2; 106/156.23; 106/157.7; 106/157.71; 106/157.8; 106/157.9
[58] Field of Search ........... 106/128.1, 131.1, 106/132.2, 134.1, 151.1, 151.2, 155.2, 156.2, 156.23, 157.8, 157.9, 157.2, 134.2, 157.7, 157.71

[56] References Cited

U.S. PATENT DOCUMENTS

| | | | |
|---|---|---|---|
| 120,996 | 11/1871 | Peting | 106/157.8 |
| 1,625,483 | 4/1927 | Marwin | 106/157.9 |
| 1,955,375 | 4/1934 | Cone et al. | 134/20 |
| 2,233,439 | 3/1941 | Wahlforss et al. | 134/12 |
| 2,246,466 | 6/1941 | Julian et al. | 260/112 |
| 2,266,736 | 12/1941 | Bradshaw | 106/157.8 |
| 2,274,983 | 3/1942 | Hieronymus | 260/112 |
| 2,397,307 | 3/1946 | Youtz | 260/112 |
| 2,849,334 | 8/1958 | Hart | 117/64 |
| 2,862,918 | 12/1958 | Meyer et al. | 260/123.5 |
| 2,932,589 | 4/1960 | Meyer et al. | 117/156 |
| 3,411,925 | 11/1968 | Lauterbach | 106/157 |
| 4,309,344 | 1/1982 | Walsh | 260/123.5 |
| 4,352,692 | 10/1982 | Krinsik et al. | 106/79 |
| 4,421,564 | 12/1983 | Graham et al. | 106/154 R |
| 4,474,694 | 10/1984 | Coco et al. | 260/123.5 |
| 4,607,089 | 8/1986 | Riley et al. | 527/201 |
| 4,689,381 | 8/1987 | Krinski et al. | 527/201 |
| 4,713,116 | 12/1987 | Krinski et al. | 106/154.1 |
| 4,906,482 | 3/1990 | Zemel et al. | 426/74 |
| 4,961,788 | 10/1990 | Krinski et al. | 106/154 |

OTHER PUBLICATIONS

"Pigment Coating," Pulp and Paper Chemistry and Chemical Technology pp. 1551–1753, (1961) Casey, J.P.

"Isolated Soy Protein Binders for Paper and Paperboard Coatings," Protein Binders in Paper and Paperboard Coating, TAPPI Monograph No. ??, pp. 75–96, Olson, R. A. and Hoelderle, P.T.

*Primary Examiner*—David Brunsman
*Attorney, Agent, or Firm*—Richard B. Taylor

[57] ABSTRACT

A paper coating composition comprising a paper coating pigment and a protein adhesive. The protein adhesive contains a protein material and a dispersing agent, in an amount effective to adjust the pH of an aqueous solution containing the paper coating composition sufficiently to substantially solubilize the protein material, comprising a basic reagent containing a divalent cation and a cation binding agent. The cation binding agent is present in an amount effective to inhibit divalent cation induced gel formation and pigment flocculation.

30 Claims, No Drawings

PROTEIN ADHESIVE BINDER AND PROCESS FOR FORMING A PROTEIN ADHESIVE BINDER

BACKGROUND OF THE INVENTION

This invention relates to a protein adhesive binder for use as an adhesive binder in a paper coating composition and a process for forming a protein adhesive binder.

Pigment containing paper coatings provide paper with a desirable finish, gloss, and smoothness. A pigment containing paper coating is typically an aqueous mixture of a pigment and an adhesive which is applied to paper. The pigment in the coating fills in irregularities in the paper surface and produces an even and uniformly absorbent surface for printing. The adhesive functions to bind the pigment particles to each other as well as to the surface of the paper.

Protein materials are well known as adhesive binders for use in pigment containing coatings. Protein materials commonly used as adhesive binders include casein, soybean protein materials including soy protein isolate, soy concentrate, soy flour and soy meal, and corn protein materials including corn gluten meal and zein.

The protein materials are often modified to enhance the effectiveness of the protein material as an adhesive binder. Protein materials may be hydrolyzed to increase the solubility of the protein material in an aqueous coating solution and decrease the viscosity of the solution. The protein materials may also be chemically or enzymatically modified. For example, a protein material may be chemically or enzymatically hydrolyzed, acylated; oxidized, and/or reduced, to increase the solubility of the protein material, to decrease the viscosity of a solution of the protein material, to increase the amount of protein material that may be incorporated into the coating composition, to increase the stability of the protein material adhesive, to increase the whiteness, brightness, and gloss of a paper coated with the coating composition, and to increase the ink receptivity of paper coated with the coating composition.

A coating composition containing a protein material adhesive binder is formed by dispersing the protein material in water and adding the pigment, typically finely divided mineral substances such as calcium carbonate, titanium dioxide, satin white, clay, and the like, to the aqueous solution of protein material. The protein material is usually not highly soluble in water at a neutral pH, even when modified, so a dispersing agent is added to aid in solvating the protein material in the water prior to addition of the pigment.

The dispersing agents used to solubilize the protein material in water are typically basic reagents which raise the pH of the protein material slurry, thereby causing the protein to become more soluble in the solution. Conventionally, the type of basic reagent used is quite important. Monovalent cation containing basic reagents (hereafter "monovalent basic reagents"), most commonly sodium hydroxide, ammonium hydroxide, and ammonia, are used as dispersing agents since divalent cations from divalent cation containing basic reagents (hereafter "divalent basic reagents") often induce dried soybean protein materials, corn protein materials, and all types of modified protein materials to form a protein gel which is detrimental to the formation of a consistent paper coating composition. Modified protein materials are particularly susceptible to divalent cation induced gel formation. Further, divalent cations from divalent basic reagents tend to flocculate the pigments in protein adhesive paper coating compositions, including casein compositions, resulting in paper coating compositions which provide an uneven pigment coat.

It is desirable, however, to utilize divalent basic reagents, particularly alkaline earth hydroxides and alkaline earth oxides, as dispersing agents for protein adhesives. Divalent basic reagents, preferably alkaline earth basic reagents, particularly hydroxides, could be added to and stored with the dry protein adhesive material, unlike monovalent basic reagents which are much more hygroscopic. The combined protein adhesive material and divalent basic reagent could be utilized merely by placing the product in water and adding pigment without having to add a dispersing agent. Furthermore, some divalent basic reagents, such as lime and slaked lime, are quite inexpensive and are desirable as low cost dispersing agents.

U.S. Pat. No. 1,955,375 to Cone and Brown, and U.S. Pat. No. 2,233,439 to Wahlforss and Satosky teach forming a protein material which is dispersible in lime. A protein material is partially solubilized in an aqueous lime solution, where a portion of the protein material forms a gel. The gel is separated from the soluble protein, and the soluble protein is precipitated with acid to provide a protein material that is soluble in lime. At least about 33% of the protein material, and sometimes over 50% of the protein material is lost in the gel, therefore, a more efficient means of dispersing a protein material for a protein adhesive in a divalent basic reagent is desirable.

It is therefore an object of the invention to provide a protein adhesive for a paper coating composition containing a divalent cation containing dispersing agent (hereafter "divalent dispersing agent"), preferably an alkaline earth hydroxide or alkaline earth oxide, which will disperse a protein material in an aqueous solution without forming a divalent cation induced protein gel, without substantial loss of protein, and without flocculating a pigment added to the solution of dispersed protein adhesive.

It is another object of the invention to provide a process for forming an aqueous solution of a protein adhesive with a divalent dispersing agent, preferably an alkaline earth oxide or alkaline earth hydroxide, without forming a divalent cation induced protein gel, without substantial loss of protein, and without flocculating a pigment added to the solution of protein adhesive.

SUMMARY OF THE INVENTION

A protein adhesive is provided for use as an adhesive binder in a paper coating composition. The protein adhesive contains a protein material, a divalent dispersing agent, preferably an alkaline earth oxide or alkaline earth hydroxide, and a cation binding agent. The protein material is effective for use as an adhesive binder. The dispersing agent is combined with the protein material in an amount effective to adjust the pH of an aqueous solution of the protein material sufficiently to substantially solubilize the protein material. The cation binding agent is combined with the protein material and the dispersing agent in an amount effective to inhibit cation induced protein gel formation in an aqueous solution containing the protein adhesive.

A process for forming a protein adhesive for a paper coating composition using a divalent dispersing agent, preferably an alkaline earth oxide or alkaline earth hydroxide, is also provided. A protein material, a divalent dispersing agent, preferably an alkaline earth oxide or alkaline earth hydroxide, and a cation binding agent are provided. The protein material is suitable for use as an adhesive binder in a paper coating composition. The dispersing agent is provided in an amount effective to adjust the pH of an aqueous solution containing the protein material sufficiently to substantially solubilize the protein material in the solution. The cation binding agent is provided in an amount effective to inhibit cation induced protein gel formation in an aqueous solution containing the protein material and the dispersing agent. The protein material, dispersing agent, and cation binding agent are mixed to form the protein adhesive. The protein material, dispersing agent, and cation binding agent may be dry blended, or may be mixed in water.

The cation binding agent in the protein adhesive composition and process serves to inhibit divalent cation induced protein gel formation by scavenging or sequestering divalent cations released by the dispersing agent in an aqueous solution of the dispersing agent, protein material, and cation binding agent. The divalent cations, therefore, are not present in a high enough concentration in the solution to sufficiently interact with the protein material to cause the protein material to gel. Preferably the cation binding agent is either a chelating agent which sequesters divalent cations, or a salt forming agent which will form a salt with divalent cations which is insoluble or only slightly soluble in an aqueous alkaline solution.

The cation binding agent also inhibits divalent cation induced pigment flocculation in the paper coating composition. Pigment flocculation caused by interaction of divalent cations released by the dispersing agent with the pigment is inhibited by the divalent cation scavenging or sequestering activity of the cation binding agent.

DESCRIPTION OF THE PREFERRED EMBODIMENTS

The protein adhesive of the present invention contains a protein material, a dispersing agent for dispersing the protein material in an aqueous medium, and a cation binding agent for binding cations released in the aqueous medium by the dissociation of the dispersing agent, thereby inhibiting the formation of a cation induced protein gel. The protein adhesive may be formed by dry blending these components, or by mixing the components in an aqueous medium.

The protein material useful in the protein adhesive of the present invention is a protein material selected from casein, soybean protein, corn protein, wheat protein, and pea protein.

Casein is prepared by coagulation of a curd from skim milk. The casein is coagulated by acid coagulation, natural souring, or rennet coagulation. To effect acid coagulation of casein a suitable acid, preferably hydrochloric acid, is added to milk to lower the pH of the milk to about the isoelectric point of the casein, preferably to a pH of about 4 to about 5, and most preferably to a pH of about 4.6 to about 4.8. To effect coagulation by natural souring milk is held in vats to ferment, causing lactic acid to form. The milk is fermented for a sufficient period of time to allow the formed lactic acid to coagulate a substantial portion of the casein in the milk. To effect coagulation of casein with rennet, sufficient rennet is added to the milk to precipitate a substantial portion of the casein in the milk. Acid coagulated, naturally soured, and rennet precipitated casein are all commercially available from numerous manufacturers or supply houses.

Soybean protein materials which are useful for forming protein adhesive paper coatings in accordance with the present invention are soy flour, soy concentrate, and, most preferably, soy protein isolate. The soy flour, soy concentrate, and soy protein isolate are formed from a soybean starting material which may be soybeans or a soybean derivative. Preferably the soybean starting material is either soybean cake, soybean chips, soybean meal, soybean flakes, or a mixture of these materials. The soybean cake, chips, meal, or flakes may be formed from soybeans according to conventional procedures in the art, where soybean cake and soybean chips are formed by extraction of part of the oil in soybeans by pressure or solvents, soybean flakes are formed by cracking, heating, and flaking soybeans and reducing the oil content of the soybeans by solvent extraction, and soybean meal is formed by grinding soybean cake, chips, or flakes.

Soy flour, as that term is used herein, refers to a comminuted form of defatted soybean material, preferably containing less than 1% oil, formed of particles having a size such that the particles can pass through a No. 100 mesh (U.S. Standard) screen. The soy cake, chips, flakes, meal, or mixture of the materials are comminuted into a soy flour using conventional soy grinding processes. Soy flour has a soy protein content of about 40% to about 60%, with the remaining material in the flour being inert material in a protein adhesive paper coating. Preferably the flour is very finely ground, most preferably so that less than about 1% of the flour is retained on a 300 mesh (U.S. Standard) screen, to minimize specking of the inert material in the paper coating.

Soy concentrate, as the term is used herein, refers to a soy protein material containing about 60% to about 80% of soy protein. Soy concentrate is preferably formed from a commercially available defatted soy flake material from which the oil has been removed by solvent extraction. The soy concentrate is produced by washing the soy flake material with an aqueous solvent having a pH at about the isoelectric point of soy protein, preferably at a pH of about 4 to about 5, and most preferably at a pH of about 4.4 to about 4.6. The isoelectric wash removes a large amount of water soluble carbohydrates and other water soluble components from the flakes, but removes little of the protein, thereby forming a soy concentrate. The soy concentrate is dried after the isoelectric wash.

Soy protein isolate, as the term is used herein, refers to a soy protein material containing about 80% or greater protein content, preferably about 90% or greater protein content, and most preferably about 95% or greater protein content. Soy protein isolate is preferably formed from a commercially available defatted soy flake material from which oil has been removed by solvent extraction. The soy flake material is extracted with an aqueous alkaline solution, typically a calcium hydroxide or a sodium hydroxide solution having a pH of about 6 to about 10, to form an extract containing protein and water soluble components of the soy flake material which is separated from the insoluble fibers and cellulosic materials of the flakes. The extract is then treated with an acid to lower the pH of the extract to about the isoelectric point of the protein, preferably to a pH of about 4 to about 5, and most preferably to a pH of about 4.4 to about 4.6, thereby precipitating the protein. The protein is then separated from the extract and dried using conventional separating and drying means to form the soy protein isolate.

Soy flour, soy concentrate, and soy protein isolate are commercially available from manufacturers of soy products. For example, soy protein isolate is available as "Pro Cote 9000Z" from Protein Technologies International, Inc. (PTI), Checkerboard Square, St. Louis, Mo. 63164.

Corn protein materials that are useful in the protein adhesive of the present invention include corn gluten meal, and, most preferably, zein. Corn gluten meal is obtained from conventional corn refining processes, and is commercially available. Corn gluten meal contains about 50% to about 60% corn protein and about 40% to about 50% starch. Zein is a commercially available purified corn protein which is produced by extracting corn gluten meal with a dilute alcohol, preferably dilute isopropanol.

Preferably the protein material used in the protein adhesive of the present invention, especially a soy protein material or a corn protein material, is modified to enhance the characteristics of the protein material as a protein adhesive. The modifications are modifications which are known in the art to improve the utility or characteristics of a protein material as a protein adhesive in paper coatings, including, but not limited to, denaturation and hydrolysis, acylation, reduction, and oxidation of the protein material.

The protein material may be denatured and hydrolyzed to lower the viscosity of coating compositions containing the protein material as a binder, to increase the adhesive strength of the protein material when it is dispersed in weak alkaline solutions, and further to reduce the sensitivity of the protein material to heat. Chemical denaturation and hydrolysis of protein materials is well known in the art and typically consists of treating a protein material with one or more alkaline reagents in an aqueous solution under controlled conditions of pH and temperature for a period of time sufficient to denature and hydrolyze the protein material to a desired extent. Typical conditions utilized for chemical denaturing and hydrolyzing a protein material to be used as a protein adhesive are: a pH of about 11 to about 13; a temperature of about 50° C. to about 80° C.; and a time period of about 15 minutes to about 3 hours, where the denaturation and hydrolysis of the protein material occurs more rapidly at higher pH and temperature conditions.

Hydrolysis of the protein material may also be effected by treating the protein material with an enzyme capable of hydrolyzing the protein. Many enzymes are known in the art which hydrolyze protein materials, including, but not limited to, fungal proteases, pectinases, lactases, and chymotrypsin. Enzyme hydrolysis is effected by adding a sufficient amount of enzyme to an aqueous dispersion of protein material, typically from about 0.1% to about 10% enzyme by weight of the protein material, and treating the enzyme and protein dispersion at a temperature, typically from about 5° C. to about 75° C., and a pH, typically from about 3 to about 9, at which the enzyme is active for a period of time sufficient to hydrolyze the protein material. After sufficient hydrolysis has occurred the enzyme is deactivated by heating, and the protein material is precipitated from the solution by adjusting the pH of the solution to about the isoelectric point of the protein material.

The protein material of the protein adhesive paper coating composition of the present invention may be acylated to decrease the viscosity of the protein adhesive coating composition, to increase the amount of protein material dispersible in the coating composition, to increase the adhesiveness of the protein material, to increase the dispersability of the protein material in coating composition, and to control the protein-pigment interactions in typical coatings. Acylation of protein materials to form protein adhesives for pigment paper coating compositions is known in the art, for example U.S. Pat. Nos. 2,862,918 and 2,932,589 to Meyer et al., incorporated herein by reference, provide methods for acylating hydrolyzed or partially hydrolyzed protein materials, and U.S. Pat. No. 4,474,694 to Coco et al., incorporated herein by reference, provides a method for acylating substantially unhydrolyzed protein materials. The acylating agents preferably used to acylate a protein material to be used in a paper coating composition are carboxylic acid anhydrides, more preferably dicarboxylic acid anhydrides, and most preferably phthalic acid anhydride, succinic acid anhydride, or maleic acid anhydride, which are typically added to a solution of the protein material in an amount of about 5% to about 10% by weight of the protein material. The protein material can be acylated in an alkaline solution, preferably having a pH above about 8, and most preferably having a pH of about 9 to about 10.5, at a temperature above ambient room temperature but below about 95° C., and more preferably below about 65° C. The protein material can be treated with the acylating agent at acylating pH and temperature conditions for a period of time sufficient to substantially acylate the protein material, after which the protein material is precipitated from the acylating solution by lowering the pH of the solution to about the isoelectric point of the protein material with a suitable acidic reagent.

In a preferred embodiment, the protein material of a protein adhesive paper coating composition formed according to the present invention is treated with a reducing agent prior to acylation, as described in U.S. Pat. No. 4,474,694 to Coco et al. The reducing agent, preferably thioglycolic acid, ammonium thioglycolate, sodium sulfite, or sulfur dioxide, cleaves the disulfide bonds of the protein material to unfold the protein material and render more protein sites available for acylation. While Coco et al. describes reducing unhydrolyzed or minimally hydrolyzed protein materials, the protein material used in the protein adhesive of the present invention can be a modified protein material which is hydrolyzed, then reduced and acylated.

The protein material of the protein adhesive paper coating composition of the present invention may also be oxidized. Oxidation can increase the shelf-life of paper coating compositions containing the oxidized protein adhesive and can improve the color of the paper coating compositions. Oxidation of protein materials for use as protein adhesives in a paper coating composition is known, for example U.S. Pat. No. 2,246,466 to Julian and Malter, incorporated herein by reference, teaches oxidation of a protein material for use as a protein adhesive, and U.S. Pat. No. 4,961,788 to Krinski et al., incorporated herein by reference, teaches oxidation of a carboxylated protein material to form a protein adhesive. The oxidizing agents used to oxidize the protein material include conventional oxidizing agents such as hydrogen peroxide, sodium peroxide, and ozone. Preferably about 3% to about 25% of hydrogen peroxide by weight of the protein material is added to an alkaline solution of the protein material at a pH and temperature, and for a time period, effective to oxidize the protein material.

Other modifications may be made to the protein material, as desired, and the protein adhesive of the present invention is not limited to protein materials modified by hydrolysis, denaturation, acylation, reduction, and oxidation, and non-modified protein materials.

The dispersing agent of the protein adhesive is a basic reagent which, when placed in an aqueous solution, dissociates into a divalent cation and one or more anions. Preferably the dispersing agent is an alkaline earth oxide or alkaline earth hydroxide, and most preferably is either calcium oxide (lime) or calcium hydroxide (slaked lime).

The dispersing agent is present in the protein adhesive in an amount capable of raising the pH of an aqueous solution containing the protein material sufficiently to substantially solubilize the protein material in the solution. Preferably the dispersing agent is present in the protein adhesive in about 1% to about 20% by weight of the protein adhesive, preferably about 1% to about 10% by weight of the protein adhesive, and most preferably about 2% to about 8% by weight of the protein adhesive. The dispersing agent preferably raises the pH of water having about neutral pH in which the protein adhesive is dispersed to a pH of above about 6.0, preferably above a pH of about 8.5, and most preferably above about pH 10.0.

The cation binding agent of the protein adhesive is a compound which can complex or precipitate divalent cations in an aqueous alkaline solution. The cation binding agent can form an insoluble or only slightly soluble salt with, or complex, free divalent cations resulting from dissociation of the dispersing agent in the aqueous protein adhesive solution. If desired, the cation binding agent can be a mixture of one or more of complexing agents and one or more salt forming agents. In a preferred embodiment, the cation binding agent is capable of forming an insoluble or only slightly soluble salt with, or chelating, alkaline earth cations, most preferably calcium ions.

The cation binding agent may be a chelating agent which can complex the divalent cation resulting from dissociation of the dispersing agent in the aqueous protein adhesive solution. The chelating agent should be soluble in an aqueous alkaline solution of the protein material and the dispersing agent. Preferred chelating agents for use as the cation binding agent include ethylenediaminetetraacetic acid ("EDTA"), EDTA alkali salts, preferably sodium and potassium EDTA salts, and most preferably EDTA tetrasodium salt, citric acid and its alkali salts, preferably sodium citrate, alkali phosphates such as trisodium phosphate and tripotassium phosphate, and alkali polyphosphates such as sodium hexametaphosphate and potassium hexametaphosphate. Particularly preferred chelating agents include EDTA tetrasodium salt and trisodium phosphate.

The cation binding agent may also be a salt forming agent which can form an insoluble or slightly soluble salt in an aqueous alkaline medium with a divalent cation resulting from dissociation of the dispersing agent in the aqueous protein adhesive solution. Preferably the salt forming agents are alkali metal salts which dissociate into alkali cations and anions which form salts with the divalent cations from the dispersing agent. Suitable salt forming cation binding agents include, but are not limited to, sodium carbonate; sodium bicarbonate; sodium silicate; phosphates, preferably trisodium phosphate, tripotassium phosphate, disodium phosphate, dipotassium phosphate, sodium phosphate, and potassium phosphate; phosphoric acid; potassium carbonate; and potassium bicarbonate. Most preferably, the salt forming agents are alkali metal carbonates, such as sodium carbonate or potassium carbonate, which form calcium carbonate salts with calcium cations from a calcium hydroxide or calcium oxide dispersing agent.

The cation binding agent is present in the protein adhesive in an amount effective to inhibit divalent cation induced protein gel formation in an aqueous solution containing the protein material and dispersing agent of the protein adhesive by lowering the concentration of divalent cations available in the solution to form a gel with the protein material. The amount of gel acceptable in a paper coating composition for a particular paper coating application will determine the minimum amount of cation binding agent required in the protein adhesive for that application. Acceptable 140 mesh gel levels, described in more detail below, may be 50 ml of gel/100 grams of dry protein adhesive or higher, although preferred 140 mesh gel levels are about 3 ml of gel/100 grams of dry protein adhesive, and most preferably about 1 ml of gel/100 grams of dry protein adhesive. The amount of cation binding agent required is also dependent on the agent or agents selected to bind the cations, as some cation binding agents are more effective than others. Typically, the cation binding agent, as an individual compound or a mixture of compounds, is present in the protein adhesive composition in about 0.5% to about 20% by weight of the dry protein adhesive composition, and most preferably is present in about 4% to about 10% by weight of the dry protein adhesive composition.

The protein adhesive of the present invention is formed by combining the protein material, the dispersing agent, and the cation binding agent by either dry-blending the protein adhesive components or by mixing the components in an aqueous solution. The dispersing agent, cation binding agent, or both may be dry-blended with the protein material utilizing conventional equipment for blending dry granulated or powered materials such as a ribbon or a rotary dry powder blender. Any component of the protein adhesive not dry-blended with the protein material is subsequently added to an aqueous slurry of the protein material to form the protein adhesive solution.

A protein adhesive solution is formed with the protein adhesive, either from a dry-blend of the protein adhesive components or from the addition of the components individually to an aqueous solution, so that a paper coating composition may be formed from the protein adhesive solution and a paper coating pigment. The paper coating composition may be formed by adding a paper coating pigment to a protein adhesive solution formed according to the present invention, by adding a dry-blended protein adhesive of the present invention to an aqueous solution containing the pigment, or by combining an aqueous solution of the protein adhesive with an aqueous slurry containing the pigment. Preferably, the protein adhesive solution is prepared before being combined with the pigment so the protein material can be more easily dispersed in the aqueous solution.

The protein adhesive solution can be prepared by adding the protein material, dispersing agent, and cation binding agent to an aqueous solution, which may include the paper coating pigment, and applying mechanical shear to the solution at a temperature and for a time sufficient to solubilize the protein material. Preferably the protein adhesive is added to the aqueous solution so the protein adhesive solution contains up to about 40% of the protein adhesive by weight of the protein adhesive solution, more preferably about 10% to about 30%, and most preferably about 15% to about 20%. Although the protein material may be solubilized in the protein adhesive solution under a variety of conditions, the solution is preferably agitated for about 5 minutes to about 60 minutes at a temperature of about 20° C. to about 90° C., most preferably about 45° C. to about 65° C., to solubilize the protein material. The mechanical shear is applied to the solution by any conventional means for mixing solutions such as an agitating tank. The pH of the protein adhesive solution is preferably at least about pH 6.0, more preferably is at least about pH 8.5, and most preferably is from about pH 8.5 to about pH 11.5.

The pigment used with the protein adhesive of the present invention to form a pigment paper coating composition may be any conventional pigment used to form such paper coating compositions. Commonly used pigments which may be utilized with the protein adhesive of the present invention include calcium carbonate, satin white, titanium dioxide, and clay. The paper coating composition is formed by thoroughly mixing the pigment and the protein adhesive so the pigment is uniformly distributed throughout the protein adhesive solution. In addition to reducing the amount of cation induced protein gel, the cation binding agent inhibits flocculation of the pigment induced by divalent cations by reducing the concentration of free divalent cations in the paper coating composition.

The following Examples represent specific but non-limiting embodiments of the present invention.

In the following examples, the 140 mesh gel, 325 mesh gel, and the viscosity of aqueous solutions of protein adhesives formed according to the present invention are measured. The 140 mesh gel and the 325 mesh gel values indicate the amount of gel formed in the aqueous protein adhesive solution. Preferred 140 mesh gel levels for protein adhesive solutions are 3 ml of gel/100 g of dry protein adhesive or less, and most preferred 140 mesh gel levels are 1 ml of gel/100 g of dry protein adhesive or less.

The 140 mesh gel and 325 mesh gel levels are measured by pouring 500 g of a protein adhesive solution through a No. 140 mesh screen (U.S. Standard) and then through a No. 325 mesh screen (U.S. Standard) to collect gels incapable of passing through the respective screens. The gel from each screen is collected in a separate conical centrifuge tube which has a graduated gel measuring scale thereon. The collected gel is centrifuged for about 10 minutes at about 1800 rpm, and the amount of gel in the centrifuge tube is measured against the graduations on the cup. The reading is normalized to provide a measurement for 100 g of the dry protein adhesive.

The viscosity of each protein adhesive solution in centipoise is measured using a Brookfield LVT viscometer (available from Brookfield Engineering Laboratories Inc., Stoughton, Mass.) at 60 rpm and at 25° C.

EXAMPLE 1

A soy protein isolate material modified by reduction, partial hydrolyzation, and acylation is formed to provide the protein material for a protein adhesive of the present invention. A defatted soy flake or flour is extracted with an alkaline aqueous solution having a pH of about 10–11, preferably an aqueous solution of calcium hydroxide or sodium hydroxide and water, to extract protein and carbohydrates from insoluble fibers. About 0.5% to about 1% ammonium thioglycolate by weight of the protein material is added to the extract to reduce the protein. The extract is stirred for about 2 to 3 minutes after addition of the ammonium thioglycolate to effect the reduction.

After the reduction about 9% sodium hydroxide by weight of the protein material is added to the extract and the extract is heated to about 60° C. to 65° C. for about 30 minutes to partially hydrolyze the protein in the protein solution. Following hydrolysis, about 6% to about 7% phthalic anhydride by weight of the protein material is added to acylate the protein material. Acylation of the protein is conducted at about 60° C. to about 65° C. for about 30 minutes. After acylation the modified protein material is precipitated by acidifying the solution to about the isoelectric point of the protein material, about pH 4, with sulfuric acid. The precipitated modified protein material is concentrated by centrifugation, and dried.

Two reference protein adhesive samples are formed with the modified protein material. One reference protein adhesive sample is formed by dispersing 68 grams of the modified protein material in an aqueous sodium hydroxide solution having pH of about 10 to form a solution having a total weight of about 500 grams. The sodium hydroxide protein solution is agitated and heated at about 60° C. for about 30 minutes to disperse the protein in the solution, then is cooled to about 25° C. in an ice bath. The second reference protein adhesive sample is formed by dry-blending 68 grams of modified protein material and 2.85 grams of calcium hydroxide and adding water to the dry-blended protein/calcium hydroxide to a total solution weight of about 500 grams and a pH of about 10. The calcium hydroxide protein solution is agitated and heated at about 60° C. for about 30 minutes to disperse the protein in the solution, then is cooled in an ice bath.

The sodium hydroxide reference sample forms a well-dispersed protein adhesive having desirable 140 mesh gel, 325 mesh gel, and viscosity characteristics. The calcium hydroxide reference sample forms a protein adhesive having excessive gel levels. Several protein adhesives formed in accordance with the present invention are measured against the two references to determine the suitability of the protein adhesives for use in paper coating applications.

Seven protein adhesive samples are formed in accordance with the present invention. Each is formed with 68 grams of the modified protein material, 2.85 grams of calcium hydroxide, and a selected cation binding agent dry-blended together. The cation binding agents in the samples are, respectively: 4.1 grams of sodium carbonate ($Na_2CO_3$); 5.5 grams of potassium carbonate ($K_2CO_3$); 16 grams of EDTA:4Na; 5 grams of sodium silicate ($Na_2SiO_3$); 6 grams of trisodium phosphate (TSP); 3.4 grams of sodium carbonate and 1.1 grams of trisodium phosphate ($Na_2CO_3$/TSP); and 6 grams of trisodium phosphate and 2.8 grams of EDTA:4Na (TSP/EDTA:4Na). Water is added to each of the protein adhesive samples to form protein adhesive solutions having a total weight of 500 grams, respectively. Each protein adhesive sample solution is heated at about 60° C. for about 30 minutes to disperse the protein material in the solution, and then the solution is cooled to about 25° C. in an ice bath.

The 140 mesh gel, the 325 mesh gel, and the viscosity of the reference protein adhesive samples and the protein adhesive samples formed according to the present invention are measured as described above. The results are set forth in Table 1.

TABLE 1

| Sample | 140 mesh gel (ml/100 g) | 325 mesh gel (ml/100 g) | Viscosity 60 rpm 25° C. (cps) |
|---|---|---|---|
| Reference 1 Dispering Agent: NaOH | 0.6 | 0.6 | 64 |
| Reference 2 Dispering Agent: Ca(OH)$_2$ | 71.0 | 14.0 | 635 |
| Na$_2$CO$_3$ Dispering Agent: Ca(OH)$_2$ | 1.1 | 0.9 | 78 |
| K$_2$CO$_3$ Dispering Agent: Ca(OH)$_2$ | 0.8 | 0.8 | 79 |
| EDTA:4Na Dispering Agent: Ca(OH)$_2$ | 0.5 | 0.7 | 177 |
| Na$_2$SiO$_3$ Dispering Agent: Ca(OH)$_2$ | 2.0 | 1.5 | 174 |
| TSP Dispering Agent: Ca(OH)$_2$ | 1.6 | 1.2 | 127 |
| Na$_2$CO$_3$/TSP Dispering Agent: Ca(OH)$_2$ | 0.6 | 0.7 | 93 |
| TSP/EDTA:4Na Dispering Agent: Ca(OH)$_2$ | 0.9 | 0.7 | 135 |

Each of the protein adhesive samples containing a calcium hydroxide dispersing agent and a cation binding agent have significantly reduced gel levels compared to the reference protein adhesive containing only a calcium hydroxide dispersing agent, and compare favorably with the reference protein adhesive containing a sodium hydroxide dispersing agent. All of the calcium hydroxide/cation binding agent protein adhesives have a 140 mesh gel level below the preferred maximum gel limit of 3.0 ml/100 g dry protein adhesive, and several preferred protein adhesives have a 140 mesh gel level below 1.0 ml/100 g dry protein adhesive.

EXAMPLE 2

Three different modified soy protein materials are formed and tested for 140 mesh gel levels, 325 mesh gel levels, and viscosity in protein adhesive compositions formed according to the present invention where the dispersing agent is calcium hydroxide and the cation binding agent is a mixture of sodium carbonate and trisodium phosphate. The first protein material is a reduced, partially hydrolyzed, and acylated protein material formed as described in Example 1 above. The second protein material is a reduced, non-hydrolyzed, and acylated protein material formed in the same manner as the first protein material except that the second protein material is not hydrolyzed. The third protein material is a protein isolate modified only by hydrolyzation. The third protein material is formed by extracting a protein material from defatted soy flakes with an aqueous alkaline solution having a pH of about 11 to about 12.5. The extract is heated to about 60° C.–65° C. for about 90 minutes to fully hydrolyze the protein material, and the hydrolyzed protein material is precipitated by acidifying the extract to about pH 4 with sulfuric acid. The precipitated third protein material is separated from the extract and dried.

Reference protein adhesive samples are formed with each of the three modified protein materials. A first reference sample ("Ref. Sample 1") is formed by dry-blending 68 grams of the first protein material with 2.9 grams of calcium hydroxide. Second and third reference samples ("Ref. Sample 2" and "Ref. Sample 3", respectively) are formed by dry-blending 68 grams of each of the second and third protein materials with 3 grams of calcium hydroxide, respectively. Water is added to each dry-blended protein adhesive reference sample to form a solution having a total weight of 500 grams. Each reference sample is heated to about 60° C. for about 30 minutes to disperse the protein material in the sample solution, and cooled to about 25° C. in an ice bath.

A protein adhesive sample in accordance with the present invention is formed with each of the three modified protein materials. A sample corresponding to the reference sample 1 is formed by dry blending 68 grams of the first protein material, 2.9 grams of calcium hydroxide, 4.1 grams of sodium carbonate, and 1.3 grams of trisodium phosphate, and adding water to the dry blended materials to a total sample weight of 500 grams ("sample 1"). Two other samples corresponding to reference samples 2 and 3, respectively, are formed by dry-blending 68 grams of the second and third protein materials, respectively, with 4.3 grams of calcium hydroxide, 4.3 grams of sodium carbonate, and 1.4 grams of trisodium phosphate, respectively, and adding water to the dry-blended materials of each sample to a total sample weight of 500 grams ("sample 2" and "sample 3", respectively). The samples are heated to about 60° C. for about 30 minutes to disperse the protein material in each sample solution and then cooled to about 25° C. in an ice bath.

The 140 mesh gel, 325 mesh gel, and viscosity of reference samples 1–3 and the corresponding samples 1–3 are measured and compared. The results are shown in Table 2.

TABLE 2

| Sample | 140 mesh gel (ml/100 g) | 325 mesh gel (ml/100 g) | Viscosity 60 rpm 25° C. (cps) |
| --- | --- | --- | --- |
| Ref. Sample 1 Reduced, Partial Hydrolysis, Acylated | 71.0 | 14.0 | 635 |
| Sample 1 Reduced, Partial Hydrolysis, Acylated | 0.9 | 0.9 | 85 |
| Ref. Sample 2 Reduced, No Hydrolysis, Acylated | Excessive | 52.0 | 36-protein does not dissolve |
| Sample 2 Reduced, No Hydrolysis, Acylated | 18.0 | 15.0 | 4840 |
| Ref. Sample 3 Full hydrolysis | 45.0 | 7.0 | 499 |
| Sample 3 Full hydrolysis | 1.6 | 1.4 | 58 |

Each of the protein adhesives including a cation binding agent in accordance with the present invention (samples 1–3), regardless of how the protein material of the adhesive is modified, have lower gel levels than protein adhesives containing similarly modified protein materials without a cation binding agent (reference samples 1–3) when the respective protein adhesives are dispersed in water with calcium hydroxide.

EXAMPLE 3

The effectiveness of protein adhesives formed according to the present invention at about pH 8.5, 10 and 11.5 is determined. A modified protein material is formed as described in Example 1 above. Three reference protein adhesive samples are formed by dry-blending three 68 gram portions of the protein material with either 4.0 grams (Ref. Sample 1), 2.4 grams (Ref. Sample 2), or 2.9 grams (Ref. Sample 3) of calcium hydroxide and dispersing the dry-blend in water to a total solution weight of 500 grams.

Each sample is then heated to about 60° C. for about 30 minutes to disperse the protein material in the solution and then is cooled to a temperature of about 25° C. in an ice bath. The pH of the samples is about 8.5, 10.1, and 11.5, respectively.

Three samples of a protein adhesive of the present invention are formed by dry-blending a 68 gram portion of the modified protein material with either: 1) 1.8 grams of calcium hydroxide, 2.6 grams of sodium carbonate, and 0.9 grams of trisodium phosphate (Sample 1); 2) 2.9 grams of calcium hydroxide, 4.1 grams of sodium carbonate, and 1.3 grams of trisodium phosphate (Sample 2); or 3) 3.8 grams of calcium hydroxide; 5.4 grams of sodium carbonate, and 1.8 grams of trisodium phosphate (Sample 3). Each of the samples is dispersed in water to a total solution weight of 500 grams. The samples are heated at 60° C. for about 30 minutes to disperse the protein material in the solution and then cooled to about 25° C. The pH of the samples, respectively, is about 8.5, 10.2, and 11.3.

The 140 mesh gel, the 325 mesh gel, and the viscosity of the reference protein adhesive samples and the protein adhesive samples of the present invention are measured. The results are set forth in Table 3.

TABLE 3

| Sample | 140 mesh gel (ml/100 g) | 325 mesh gel (ml/100 g) | Viscosity 60 rpm 25° C. (cps) |
|---|---|---|---|
| Ref. Sample 1 pH 8.5 | 181.0 | 75.0 | 195 |
| Ref. Sample 2 pH 10.1 | 71.0 | 14.0 | 635 |
| Ref. Sample 3 pH 11.5 | 14.0 | 3.0 | 219 |
| Sample 1 pH 8.5 | 13.6 | 2.4 | 123 |
| Sample 2 pH 10.2 | 0.9 | 0.9 | 85 |
| Sample 3 pH 11.3 | 1.3 | 0.8 | 77 |

Clearly, when calcium hydroxide is used as a protein dispersing agent, each of the protein adhesive samples containing cation binding agents form protein adhesive solutions having lower gel levels than protein adhesive samples at similar pH levels which contain no cation binding agent. Gel levels are also lower in the protein dispersing agents containing cation binding agents at about pH 10.2 and 11.3 compared to pH 8.5.

It will be appreciated by those skilled in the art that various changes may be made in the invention as disclosed without departing from the spirit of the invention. The invention is not to be the specifics of the disclosed embodiments, which are for the purpose of illustration, but rather is to be limited only by the scope of the appended claims and their equivalents.

What is claimed:

1. A paper coating composition, comprising:
   a paper coating pigment;
   a protein adhesive containing a protein material, a dispersing agent comprising a basic reagent containing a divalent cation, and a cation binding agent, where said dispersing agent is present in said composition in an amount effective to adjust the pH of an aqueous solution containing said paper coating composition sufficiently to substantially solubilize said protein material in said solution, and where said cation binding agent is present in said composition in an amount effective to inhibit divalent cation induced protein gel formation and divalent cation induced pigment flocculation in an aqueous solution containing said paper coating composition.

2. The paper coating composition of claim 1, further comprising water in an amount effective to form a slurry of said paper coating pigment and said protein adhesive.

3. The paper coating composition of claim 1 wherein said protein material is a vegetable protein material.

4. The paper coating composition of claim 3 wherein said vegetable protein material is a soy protein material.

5. The paper coating composition of claim 4 wherein said soy protein material is a soy protein isolate, a soy protein concentrate, a soy flour, or mixtures thereof.

6. The paper coating composition of claim 4 wherein said soy protein material is a modified soy protein material where said soy protein material is modified by reduction, hydrolyzation, acylation, oxidation, or a combination thereof.

7. The paper coating composition of claim 1 wherein said protein material is casein.

8. The paper coating composition of claim 1 wherein said protein material is present in about 60% to about 95% by weight of said protein adhesive.

9. The paper coating composition of claim 1 wherein said dispersing agent is calcium oxide or calcium hydroxide.

10. The paper coating composition of claim 1 wherein said dispersing agent is present in about 1% to about 10% of said protein adhesive by weight.

11. The paper coating composition of claim 1 wherein said cation binding agent is selected from the group comprising a chelating agent, a salt forming agent, or mixtures thereof, where said chelating agent is capable of chelating a divalent cation, and said salt forming agent is capable of forming a salt with a divalent cation which is substantially insoluble in an aqueous alkaline solution.

12. The paper coating composition of claim 11 wherein said cation binding agent is selected from the group consisting of ethylenediaminetetraacetic acid, alkali salts of ethylenediaminetetraacetic acid including ethylenediaminetetraacetic acid tetrasodium salt, citric acid, citric acid alkali salts, phosphates including trisodium phosphate, tripotassium phosphate, disodium phosphate, dipotassium phosphate, sodium phosphate, and potassium phosphate, phosphoric acid, alkali polyphosphates including sodium hexametaphosphate and potassium hexametaphosphate, sodium carbonate, sodium bicarbonate, sodium silicate, potassium carbonate, potassium bicarbonate, and mixtures thereof.

13. The paper coating composition of claim 1 wherein said cation binding agent is present in said protein adhesive in about 0.5% to about 20% by weight of said protein adhesive composition.

14. The paper coating composition of claim 1 wherein said paper coating pigment is selected from calcium carbonate, satin white, titanium dioxide, clay, or mixtures thereof.

15. A process for forming a paper coating composition, comprising:
   providing a paper coating pigment;
   providing a protein adhesive composition containing a protein material suitable for use as an adhesive binder in a paper coating composition, a dispersing agent comprising a basic reagent containing a divalent cation, and a cation binding agent, where said dispersing agent is present in an amount effective to adjust the pH of an aqueous solution containing said protein adhesive composition sufficiently to substantially solubilize said protein material in said solution, and where said cation binding agent is present in an amount effective to inhibit divalent cation induced protein gel formation or divalent cation induced pigment flocculation in an aqueous solution containing said protein material, said dispersing agent, and said paper coating pigment; and
   mixing said protein adhesive composition and said paper coating pigment to form said paper coating composition.

16. The process as set forth in claim 15, further comprising the step of mixing said paper coating composition in water.

17. The process of claim 15 wherein said paper coating pigment is provided in an aqueous slurry and said protein adhesive composition is mixed with said paper coating pigment in said slurry.

18. The process of claim 15 wherein said protein adhesive composition is provided in an aqueous slurry and said paper coating pigment is mixed with said protein adhesive in said slurry.

19. The process of claim 15 wherein said protein material is a vegetable protein material.

20. The process of claim 19 wherein said vegetable protein material is a soy protein material.

21. The process of claim 20, wherein said soy protein material is selected from the group consisting of soy protein isolate, soy protein concentrate, soy flour, and mixtures thereof.

22. The process of claim 15 wherein said protein material is casein.

23. The process of claim 15, wherein said protein material is a modified protein material where said protein material is modified by reduction, hydrolyzation, acylation, oxidation, or a combination thereof.

24. The process of claim 15 wherein said protein material is present in about 60% to about 95% by weight of said protein adhesive composition.

25. The process of claim 15 wherein said dispersing agent is calcium hydroxide or calcium oxide.

26. The process of claim 15 wherein said dispersing agent is present in about 1% to about 10% by weight of said protein adhesive composition.

27. The process of claim 15, wherein said cation binding agent is selected from the group consisting of a chelating agent, a salt forming agent, and mixtures thereof, where said chelating agent is capable of chelating a divalent cation, and said salt forming agent is capable of forming a salt which is substantially insoluble in an aqueous alkaline solution with a divalent cation.

28. The process of claim 27, wherein said cation binding agent is selected from the group consisting of ethylenediaminetetraacetic acid, alkali salts of ethylenediaminetetraacetic acid including ethylenediaminetetraacetic acid tetrasodium salt, citric acid, citric acid alkali salts, phosphates including trisodium phosphate, tripotassium phosphate, disodium phosphate, dipotassium phosphate, sodium phosphate, and potassium phosphate, phosphoric acid, alkali polyphosphates including sodium hexametaphosphate and potassium hexametaphosphate, sodium carbonate, sodium bicarbonate, sodium silicate, potassium carbonate, potassium bicarbonate, and mixtures thereof.

29. The process of claim 15, wherein said cation binding agent is present in about 0.5% to about 20% by weight of said protein adhesive composition.

30. The process of claim 15 wherein said paper coating pigment is selected from calcium carbonate, satin white, titanium dioxide, clay, or a mixture thereof.

* * * * *